US012401148B2

(12) United States Patent
Racho et al.

(10) Patent No.: US 12,401,148 B2
(45) Date of Patent: Aug. 26, 2025

(54) ELECTRICAL CONNECTOR FOR CONNECTING TO A FLAT CABLE AND ELECTRICAL ASSEMBLY USING SAME

(71) Applicant: Lear Corporation, Southfield, MI (US)

(72) Inventors: Edgar Michael T. Racho, Lapu-Lapu (PH); Albert M. Cabañero, Cebu (PH)

(73) Assignee: Lear Corporation, Southfield, MI (US)

( * ) Notice: Subject to any disclaimer, the term of this patent is extended or adjusted under 35 U.S.C. 154(b) by 251 days.

(21) Appl. No.: 17/895,194

(22) Filed: Aug. 25, 2022

(65) Prior Publication Data

US 2024/0072470 A1 Feb. 29, 2024

(51) Int. Cl.

*H01R 12/78* (2011.01)
*H01R 12/59* (2011.01)
*H01R 12/61* (2011.01)
*H01R 12/77* (2011.01)
*H01R 13/502* (2006.01)
(Continued)

(52) U.S. Cl.

CPC ........... *H01R 12/78* (2013.01); *H01R 12/592* (2013.01); *H01R 12/61* (2013.01); *H01R 12/774* (2013.01); *H01R 13/502* (2013.01); *H01R 13/516* (2013.01); *H01R 13/639* (2013.01); *H01R 12/59* (2013.01); *H01R 12/613* (2013.01);
(Continued)

(58) Field of Classification Search

CPC ...... H01R 12/78; H01R 12/592; H01R 12/61; H01R 12/774; H01R 13/502; H01R 13/516; H01R 13/639; H01R 12/59; H01R 12/613; H01R 12/77; H01R 12/771; H01R 13/506; H01R 13/62
See application file for complete search history.

(56) References Cited

U.S. PATENT DOCUMENTS 3,159,447 A 12/1964 Crimmins
4,737,118 A * 4/1988 Lockard ................ H01R 24/84 439/594
(Continued)

FOREIGN PATENT DOCUMENTS

CN 201054403 Y * 4/2008 .......... H01R 12/592
ES 2164027 A1 2/2002
(Continued)

OTHER PUBLICATIONS

Korea Office Action, KR10-2023-0101926, dated Jun. 17, 2025 (w_machine_translation).

*Primary Examiner* — Justin M Kratt
(74) *Attorney, Agent, or Firm* — Fishman Stewart PLLC

(57) ABSTRACT

An electrical connector configured for connection with a flat cable includes a housing and a wedge, in some configurations. The housing may include an internal cavity, a slot in communication with the cavity and configured for receiving said flat cable, and/or a contact plate disposed within the cavity. The wedge may be configured for connection with the contact plate. The housing and the wedge may be configured to secure a portion of said flat cable in the cavity. An electrical assembly may include the electrical connector, a second electrical connector having an identical configuration as the electrical connector, said flat cable, and/or a second flat cable. In an assembled configuration, the second electrical connector may be connected to the electrical connector such that said flat cable is electrically connected to the said second flat cable.

20 Claims, 9 Drawing Sheets

(51) Int. Cl.

| | |
|---|---|
| ***H01R 13/516*** | (2006.01) |
| ***H01R 13/639*** | (2006.01) |
| *H01R 13/506* | (2006.01) |
| *H01R 13/62* | (2006.01) |

(52) U.S. Cl.

CPC ............ *H01R 12/77* (2013.01); *H01R 12/771* (2013.01); *H01R 13/506* (2013.01); *H01R 13/62* (2013.01)

(56) References Cited

U.S. PATENT DOCUMENTS

| | | | | |
|---|---|---|---|---|
| 5,575,674 | A * | 11/1996 | Davis | H01R 24/84 439/573 |
| 6,093,055 | A | 7/2000 | Sakano | |
| 7,040,917 | B2 | 5/2006 | Yagi | |
| 7,338,310 | B2 | 3/2008 | Kumakura | |
| 7,367,837 | B2 * | 5/2008 | Pabst | H01R 12/592 439/468 |
| 7,467,970 | B2 | 12/2008 | Ikuta | |
| 9,614,334 | B2 | 4/2017 | Chen | |
| 10,431,906 | B1 | 10/2019 | Reed | |

FOREIGN PATENT DOCUMENTS

| | | | |
|---|---|---|---|
| JP | H1140220 | A | 2/1999 |
| WO | 0199147 | A2 | 12/2001 |

* cited by examiner

ELECTRICAL CONNECTOR FOR CONNECTING TO A FLAT CABLE AND ELECTRICAL ASSEMBLY USING SAME

TECHNICAL FIELD

The present disclosure generally relates to electrical assemblies including electrical connectors and/or flat cables that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
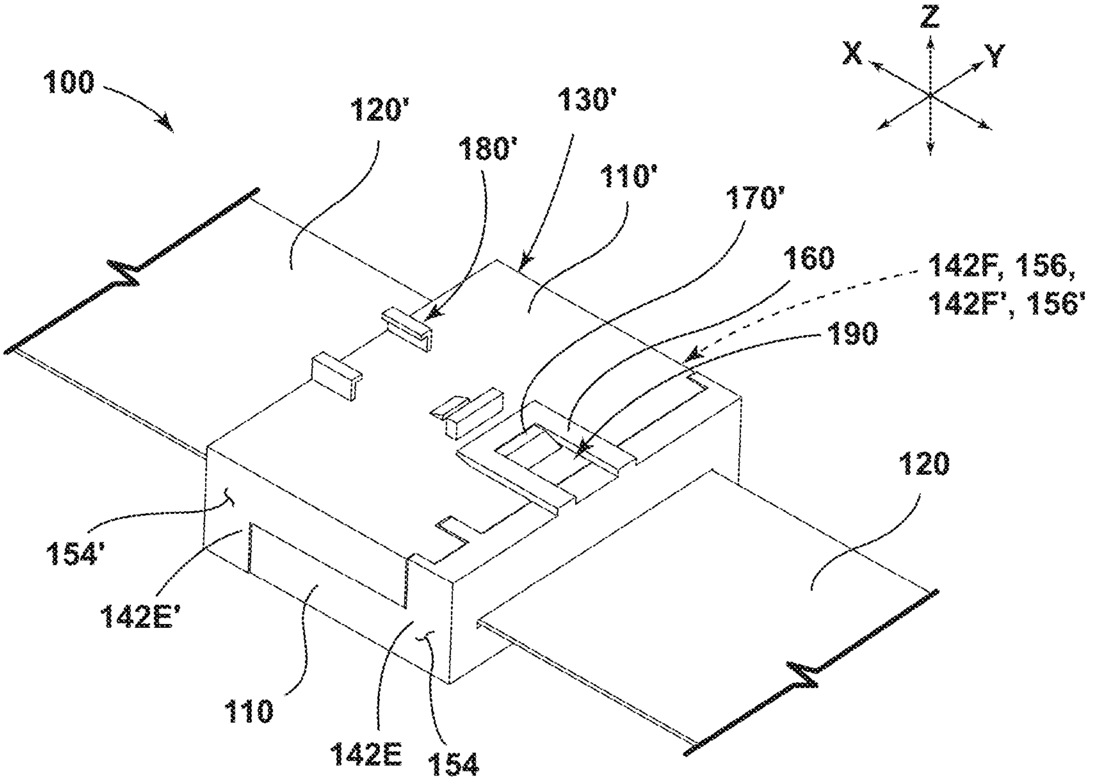
FIG. 1 is a perspective view generally illustrating an embodiment of an electrical assembly according to teachings of the present disclosure.
Figure 2:
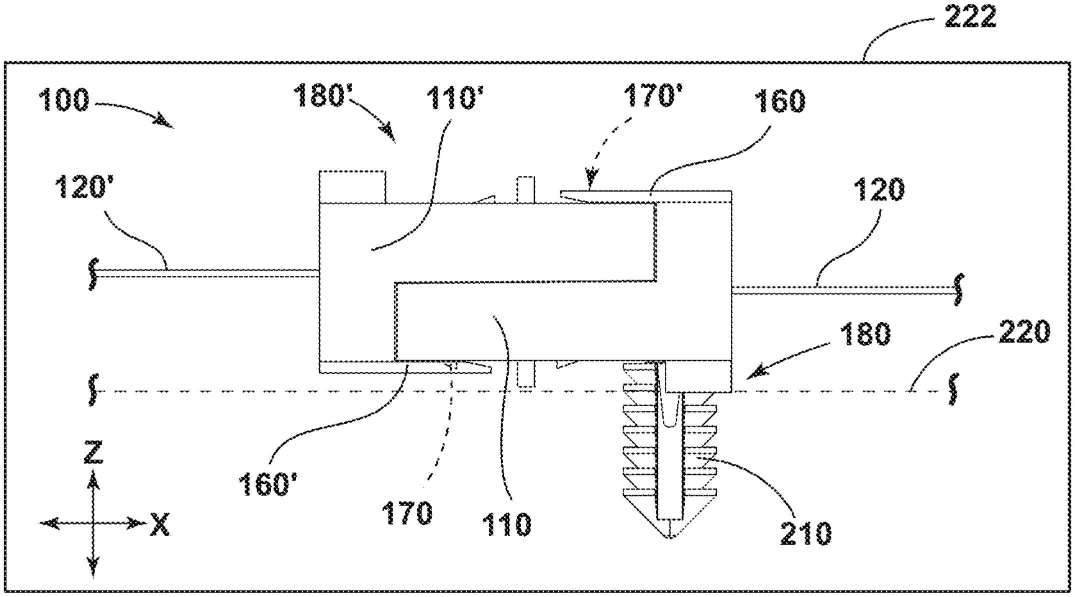
FIG. 2 is a side view generally illustrating an embodiment of an electrical assembly according to teachings of the present disclosure.

FIGS. 1 and 2 present an electrical assembly 100 including an electrical connector 110, a second electrical connector 110', a flat cable 120, and/or a second flat cable 120'. The electrical connector 110 is configured for connection with the flat cable 120 and/or the second electrical connector 110'. The second electrical connector 110' is configured for connection with the second flat cable 120' and/or the electrical connector 110. In an assembled configuration, the second electrical connector 110' is connected with the electrical connector 110 such that the flat cable 120 is electrically connected to the second flat cable 120'. In some embodiments, the second electrical connector 110' includes an identical configuration as the electrical connector 110. For example and without limitation, an electrical connector 110 (e.g., a housing 130 and/or a wedge 240) may be reversible such that the electrical connector 110, including the housing 130 and the wedge 240, are configured to mate with a second electrical connector 110' having the same configuration to electrically connect the cable 120 with the second cable 120'. In some configurations, the second electrical connector 110' may be rotated 180 degrees about an X-axis and 180 degrees about a Y-axis relative to the electrical connector 110, and then mated with the electrical connector 110 such that portions of the electrical connectors 110, 110' are inserted into each other and/or such that one or more portions/walls are flush. Embodiments of the electrical connector 110 are described below, but the second electrical connector 110' may include some or all of the same or similar features.

FIGS. 3-6 illustrate an electrical connector 110 including a housing 130 having an internal cavity 132, a slot 134, and/or a contact plate 136. The slot 134 is in communication with the cavity 132 and is configured for receiving a flat cable 120. The contact plate 136 is disposed in the cavity 132. The housing 130 includes a first end 138A, a second end 138B spaced apart from the first end 138A, an end wall 140, and/or a plurality of sidewalls 142A-F disposed between the first end 138A and the second end 138B, such as a first sidewall 142A, a second sidewall 142B, a third sidewall 142C, a fourth sidewall 142D, a fifth sidewall 142E, and/or a sixth sidewall 142F. The end wall 140 is disposed proximate the first end 138A and includes the slot 134. The housing 130 is open proximate the second end 138B such that the cavity 132 is accessible (e.g., to at least partially receive a second electrical connector 110'). The first sidewall 142A extends from the end wall 140 towards the second end 138B. The second sidewall 142B extends from the end wall 140 towards the second end 138B and is spaced apart from the first sidewall 142A. The first sidewall 142A and the second sidewall 142B may be parallel to an X-Y plane. The third sidewall 142C extends from the first sidewall 142A towards the second sidewall 142B and terminates before the second sidewall 142B. The fourth sidewall 142D extends from the first sidewall 142A towards the second sidewall 142B and terminates before the second sidewall 142B. The fourth sidewall 142D is spaced apart from the third sidewall 142C. The fifth sidewall 142E extends from the second sidewall 142B towards the first sidewall 142A. The fifth sidewall 142E includes a first portion 144A and a second portion 144B connected to the first portion 144A.

The first portion 144A terminates before the first sidewall 142A and the second portion 144B extends to the first sidewall 142A. The sixth sidewall 142F extends from the second sidewall 142B towards the first sidewall 142A and is spaced apart from the fifth sidewall 142E. The sixth sidewall 142F includes a first portion 146A and a second portion 146B that is connected to the first portion 146A. The first portion 146A terminates before the first sidewall 142A and the second portion 146B extends to the first sidewall 142A.

Figure 6:
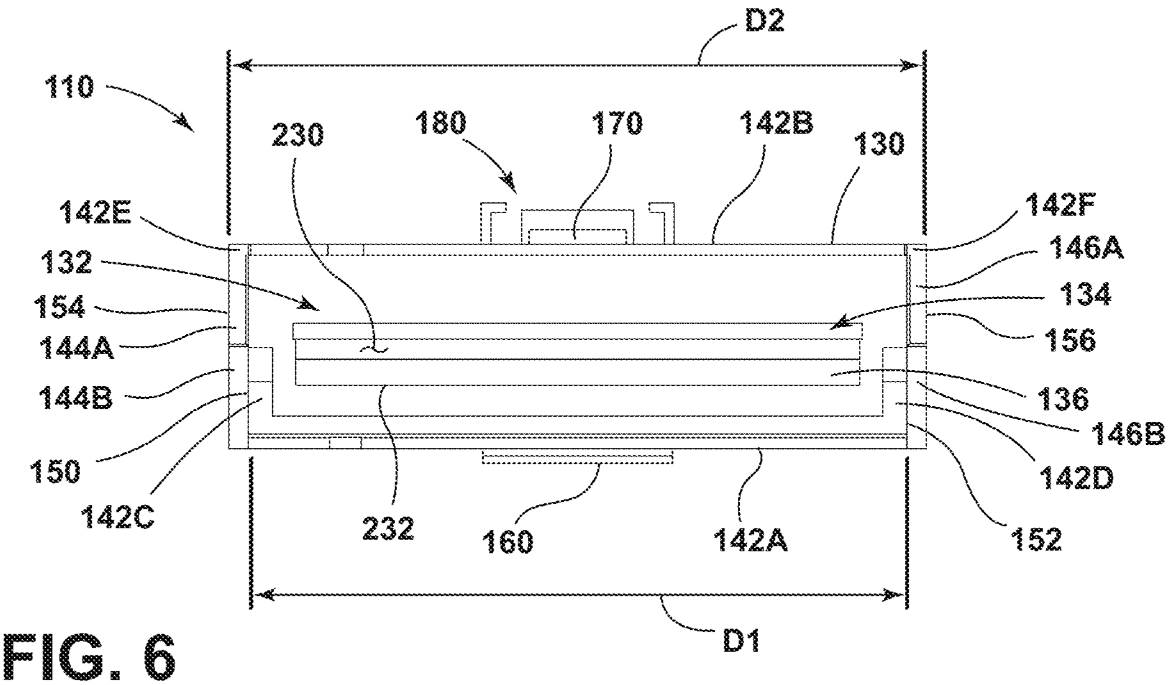
FIG. 6 is a front view generally illustrating an embodiment of a housing of an electrical connector according to teachings of the present disclosure.

With reference to FIG. 6, the housing 130 includes an outer surface 150 of the third sidewall 142C and an outer surface 152 of the fourth sidewall 142D disposed a first distance D1 from each other (e.g., in a Y-direction). An outer surface 154 of the fifth sidewall 142E to an outer surface 156 of the sixth sidewall 142F are disposed a second distance D2 from each other (e.g., in the Y-direction). In some example configurations, the first distance D1 is less than the second distance D2.

Referring now to FIGS. 3-6, the housing 130 includes a latch 160, a protrusion 170, and/or mount 180. The latch 160 extends from the end wall 140 and/or is disposed adjacent to and/or spaced apart from the first sidewall 142A. The latch 160 includes a void 190 (see, e.g., FIG. 1). The protrusion 170 extends from the second sidewall 142B (see, e.g., FIG. 3). The protrusion 170 may include a sloped configuration, among other configurations. The mount 180 extends from the second sidewall 142B.

Figure 3:
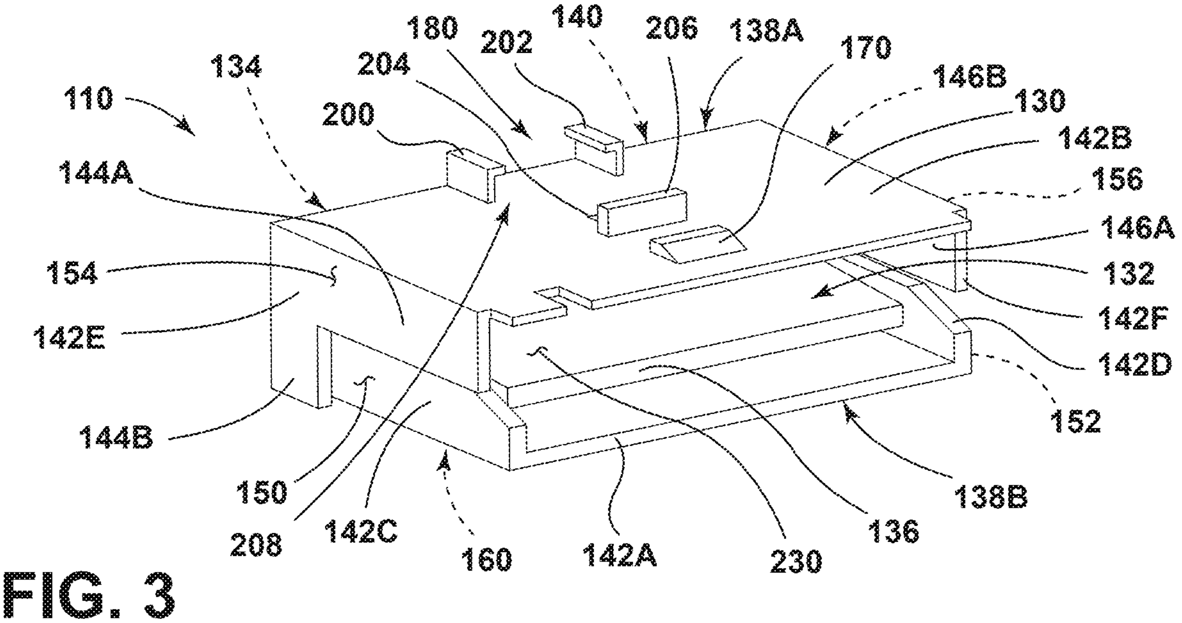
FIGS. 3 and 4 are perspective views generally illustrating an embodiment of a housing of an electrical connector according to teachings of the present disclosure.
Figure 4:
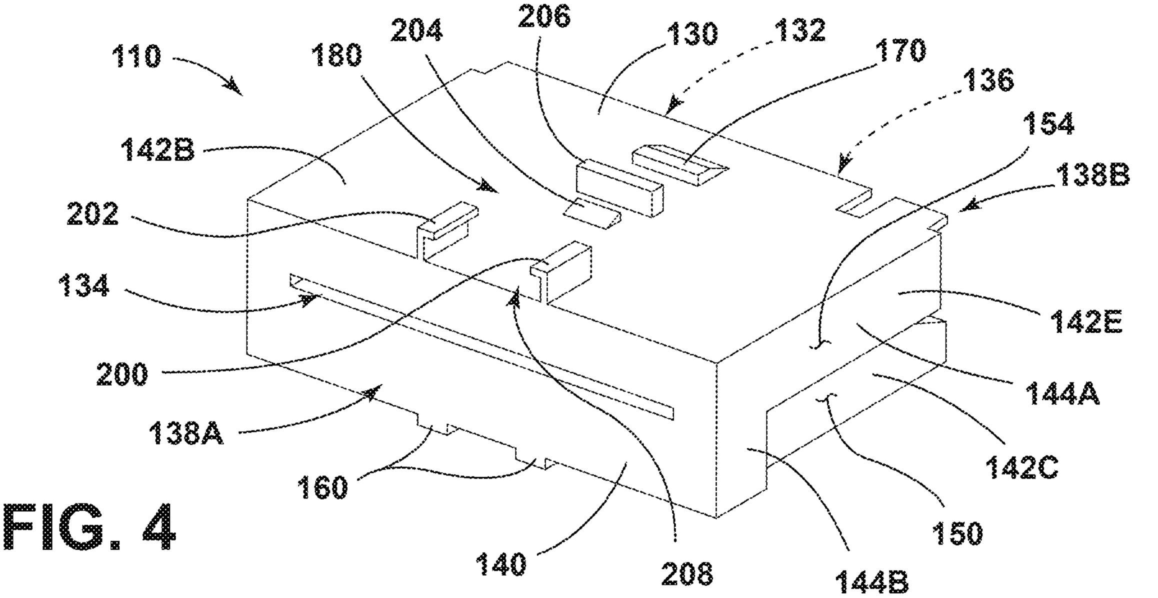

With reference to FIGS. 3 and 4, the mount 180 includes a first member 200, a second member 202, a third member 204, and/or a fourth member 206. The first member 200 and the second member 202 are disposed proximate the first end 138A of the housing 130. The second member 202 is spaced apart from the first member 200 and/or includes a similar configuration as the first member 200. For example and without limitation, the first and second members 200, 202 may include opposing L-shaped configurations that provide a channel 208. The third member 204 and the fourth member 206 are disposed spaced apart from the first end 138A. The third member 204 may include a sloped configuration, among other configurations. The fourth member 206 is spaced apart from the third member 204 and/or may include a substantially polygonal (e.g., rectangular, etc.) prism configuration. The members 200-206 may extend from the second sidewall 142B, such as generally in a Z-direction away from the electrical connector 110.

Referring now to FIG. 2, the mount 180 is configured for connection with a fastener 210 to connect an electrical connector 110, 110' and/or the electrical assembly 100 with an external object 220. The external object 220 may, for example and without limitation, include a surface, a portion, and/or a component of a vehicle 222, such as vehicle floor, a vehicle ceiling, and/or a vehicle panel, and/or may include a non-vehicle component, among others.

Figure 5:
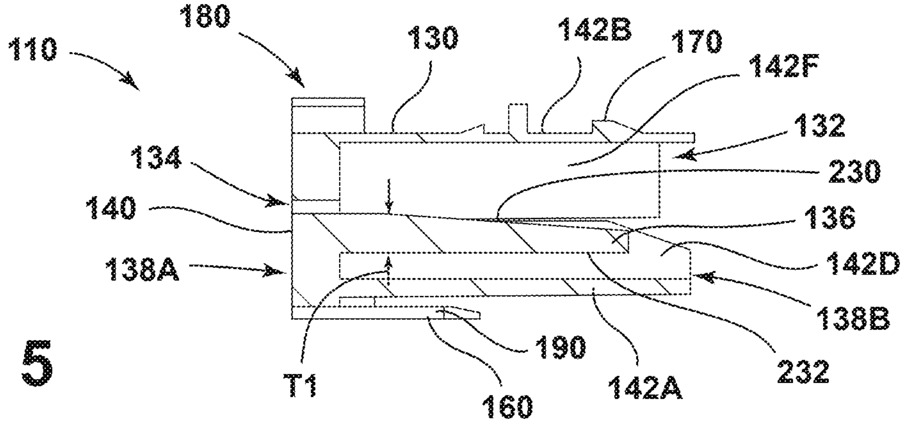
FIG. 5 is a cross-sectional view generally illustrating an embodiment of a housing of an electrical connector according to teachings of the present disclosure.

With reference to FIG. 5, the contact plate 136 of the housing 130 extends from the end wall 140 towards the second end 138B of the housing 130. The contact plate 136 includes a first surface 230 and a second surface 232 spaced apart from the first surface 230. The first surface 230 slopes downward from the first end 138A of the housing 130 towards the second end 138B of the housing 130 such that a thickness T1 of the contact plate 136 decreases from the first end 138A towards the second end 138B. The first surface 230 and the second surface 232 are configured to contact a flat cable 120.

Figure 7:
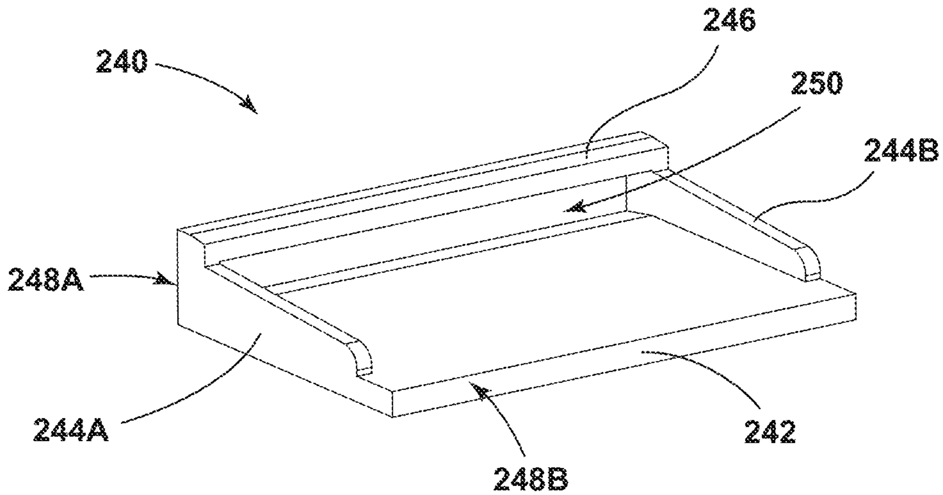
FIGS. 7 and 8 are perspective views generally illustrating an embodiment of a wedge of an electrical connector according to teachings of the present disclosure.
Figure 8:
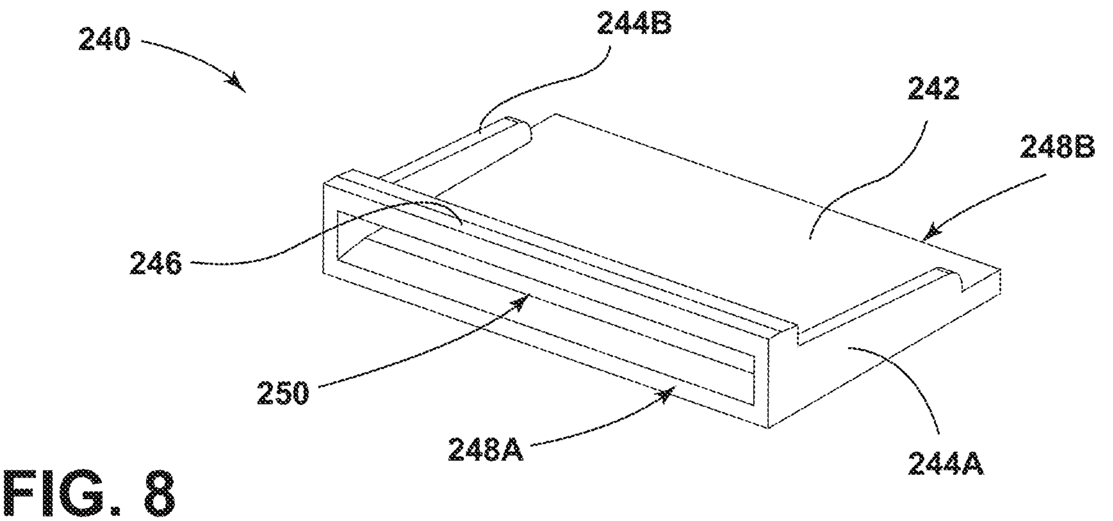

Referring now to FIGS. 7 and 8, an electrical connector 110 includes a wedge 240. A wedge 240 is configured for connection with a contact plate 136. A wedge 240 is formed separately from the housing 130. A wedge 240 and the housing 130 are configured to secure a portion of a flat cable 120 in the cavity 132. A wedge 240 includes a base 242, a first sidewall 244A, a second sidewall 244B, and/or a connecting portion 246. The base 242 includes a first end 248A and a second end 248B spaced apart from the first end 248A. The first sidewall 244A and the second sidewall 244B extend from the base 242. In some instances, the first sidewall 244A and the second sidewall 244B extend from the first end 248A towards the second end 248B and terminate before the second end 248B. The connecting portion 246 is connected to first sidewall 244A and the second sidewall 244B. The connecting portion 246 is disposed proximate the first end 248A and/or is spaced apart from the base 242. The connecting portion 246 may include a beam or bar configuration, in some examples. The base 242, the first sidewall 244A, the second sidewall 244B, and the connecting portion 246 collectively define an opening 250. The opening 250 is configured to receive portions of the contact plate 136 and a flat cable 120. In some examples, a wedge 240 is configured for connection with the contact plate 136 such that, in an assembled configuration, a part of a flat cable 120 is disposed between the base 242 and the second surface 232 of the contact plate 136, and an additional part of the flat cable 120 is disposed between the connecting portion 246 and the first surface 230 of the contact plate 136 (see, e.g., FIG. 20).

Figure 9:
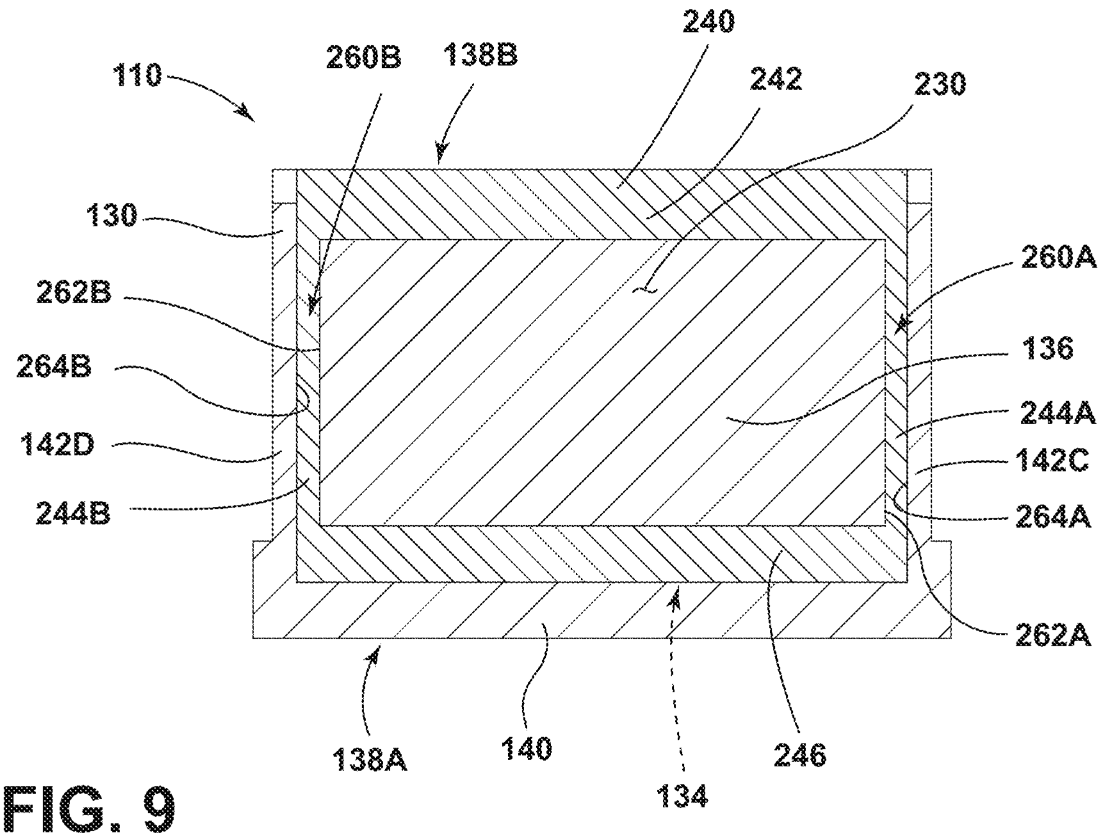
FIG. 9 is a cross-sectional view generally illustrating an embodiment of an electrical connector in an assembled configuration with a flat cable hidden according to teachings of the present disclosure.

With reference to FIG. 9, the internal cavity 132 of the housing 130 includes a first cavity portion 260A and a second cavity portion 260B. The first cavity portion 260A is disposed between a first lateral side surface 262A of the contact plate 136 and a first interior surface 264A of the housing 130. The second cavity portion 260B is disposed between a second side surface 262B of the contact plate 136 and a second interior surface 264B of the housing 130. In an assembled configuration, a portion of the first sidewall 244A of a wedge 240 is disposed in the first cavity portion 260A, and a portion of the second sidewall 244B of the wedge 240 is disposed within the second cavity portion 260B.

Figure 10:
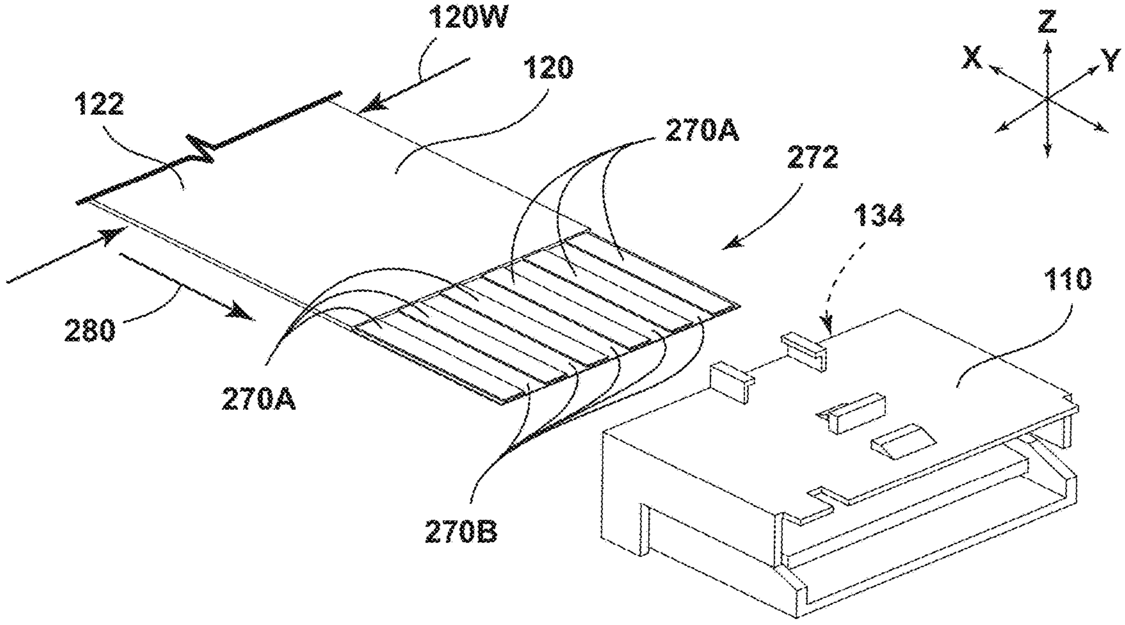
FIGS. 10 and 11 are perspective views generally illustrating an embodiment of a method of assembling an electrical assembly according to teachings of the present disclosure.

Referring now to FIG. 10, a flat cable 120 includes an elongated body 122 having one or more electrical conductors 270A and/or an insulating material 270B that may electrically insulate the conductors 270A from each other and/or other components. The one or more conductors 270A may be disposed in parallel with each other and/or may be substantially aligned with a common plane. The one or more conductors 270A may, in some configurations, be integrally formed with the insulating material 270B. The one or more conductors 270A are exposed at an end 272 of a flat cable 120. A second flat cable 120' may include the same or a similar configuration as the flat cable 120. For example, the second flat cable 120' may include one or more conductors 270A' and/or insulating material 270B'.

FIGS. 10-21 present a method of assembling an electrical assembly 100. Referring now to FIG. 10, the method includes inserting a flat cable 120 into a slot 134 of an electrical connector 110 and/or inserting a second flat cable 120' into a slot 134 of a second electrical connector 110'. For instance, an end 272 of the flat cable 120 including one or more exposed conductors 270A is inserted into the slot 134 of the electrical connector 110, and an end 272' of the second flat cable 120' including one or more exposed conductors 270A' is inserted into the slot 134 of the second electrical connector 110'.

Figure 11:
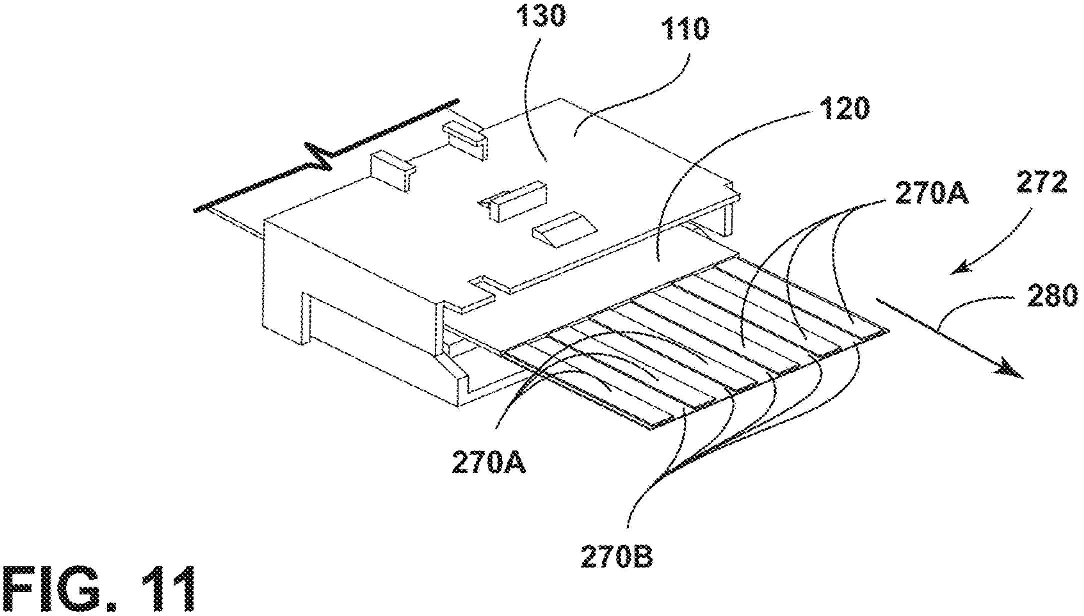

With reference to FIG. 11, the method includes moving the flat cable 120 through the electrical connector 110 (e.g., in a first direction 280) such that the end 272 of the flat cable

120 is disposed outside of the electrical connector 110, and/or moving the second flat cable 120' through the second electrical connector 110' (e.g., in a first direction 280) such that the end 272' of the second flat cable 120' is disposed outside of the second electrical connector 110'.

Figure 12:
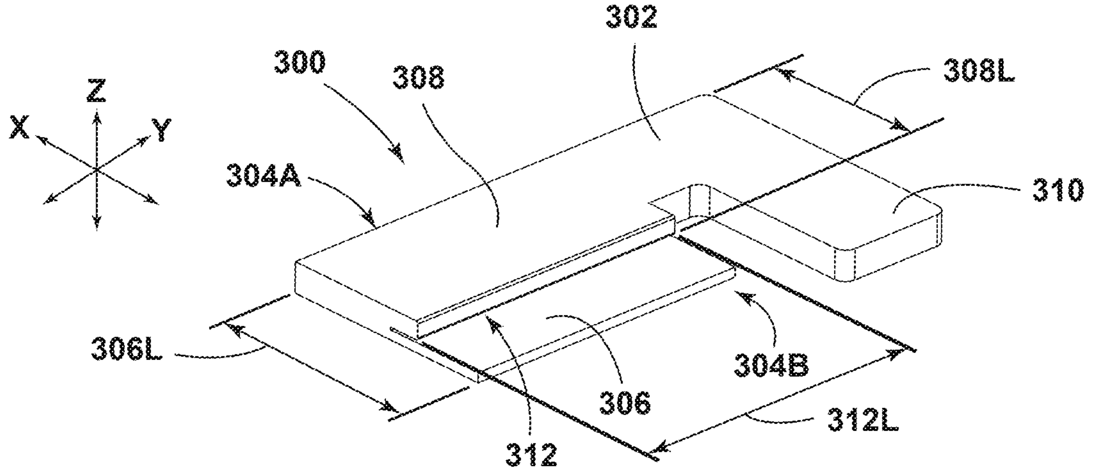
FIG. 12 is a perspective view generally illustrating an embodiment of a folding tool used in connection with a method of assembling an electrical assembly according to teachings of the present disclosure.

Referring now to FIG. 12, a folding tool 300 used in connection with some embodiments of the method is shown. The folding tool 300 includes a monolithic body 302 having a first end 304A and a second end 304B spaced apart from the first end 304A. The body 302 includes a first portion 306, a second portion 308, a third portion 310, and/or a slot 312. The first portion 306, the second portion 308, and/or the third portion 310 extend from the first end 304A towards the second end 304B. In some instances, the first portion 306 includes a length 306L (e.g., in an X-direction) that is greater than a length 308L of the second portion 308. The slot 312 extends partially into the body 302 and is disposed between the first portion 306 and the second portion 308. The slot 312 may include a length 312L (e.g., in a Y-direction) that is substantially equal to or greater than a width 120W of a flat cable 120, 120' (see, e.g., FIG. 14). The slot 312 is configured to receive a portion of a flat cable 120, 120'.

Figure 13:
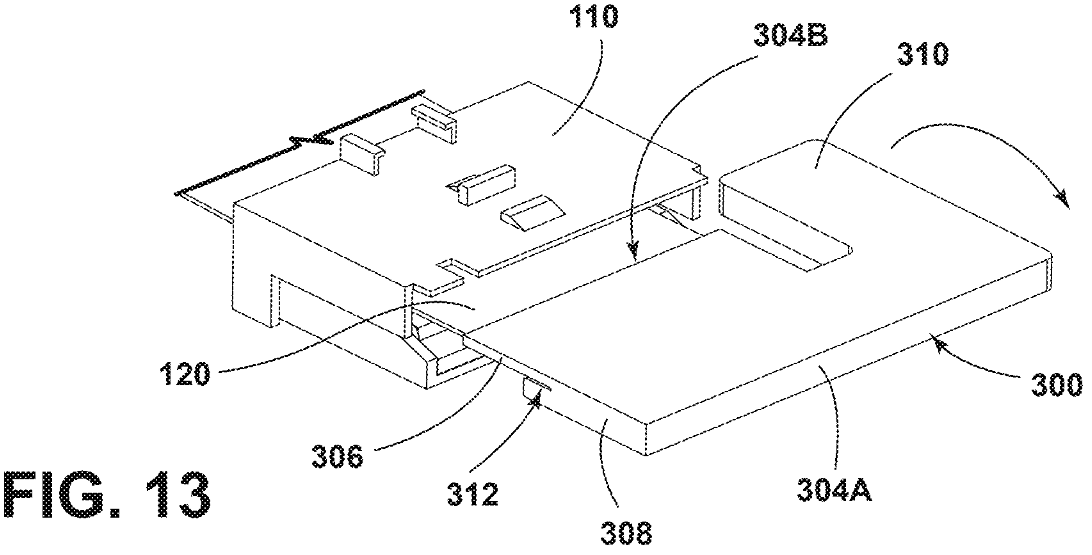
FIGS. 13-19 are perspective views generally illustrating an embodiment of a method of assembling an electrical assembly according to teachings of the present disclosure.
Figure 14:
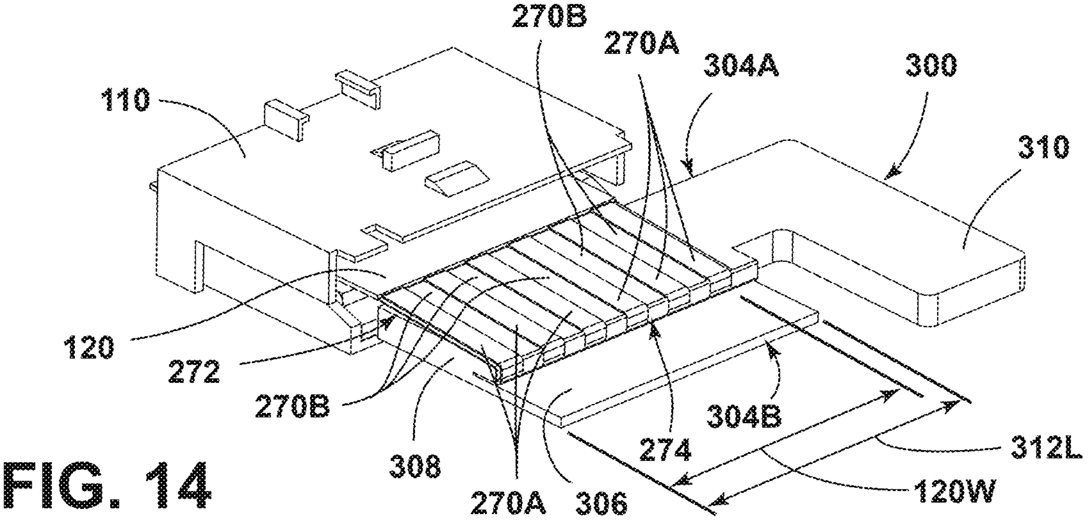

With reference to FIGS. 13 and 14, the method includes folding, via the folding tool 300, the end 272 of the flat cable 120. In some examples, the method includes inserting a portion of an end 272 of a flat cable 120 into the slot 312 of the folding tool 300. Referring now to FIG. 13, the folding tool 300 and a flat cable 120 are shown in a first position. In the first position, the second end 304B of the folding tool 300 is disposed facing the electrical connector 110. The method may include rotating the folding tool 300 approximately 180 degrees away from the electrical connector 110 to a second position. In some examples, a user may manipulate the third portion 310 of the folding tool 300 to rotate the folding tool 300 from the first position to the second position. Referring now to FIG. 14, the folding tool 300 and a flat cable 120 are shown in the second position. In the second position, the first end 304A of the folding tool 300 is disposed facing the electrical connector 110, 110' and the flat cable 120, 120' includes a folded end 274. A second cable 120' may be inserted into a connector 110' and/or folded via a folding tool 300 in the same or a similar manner as the cable 120.

Figure 15:
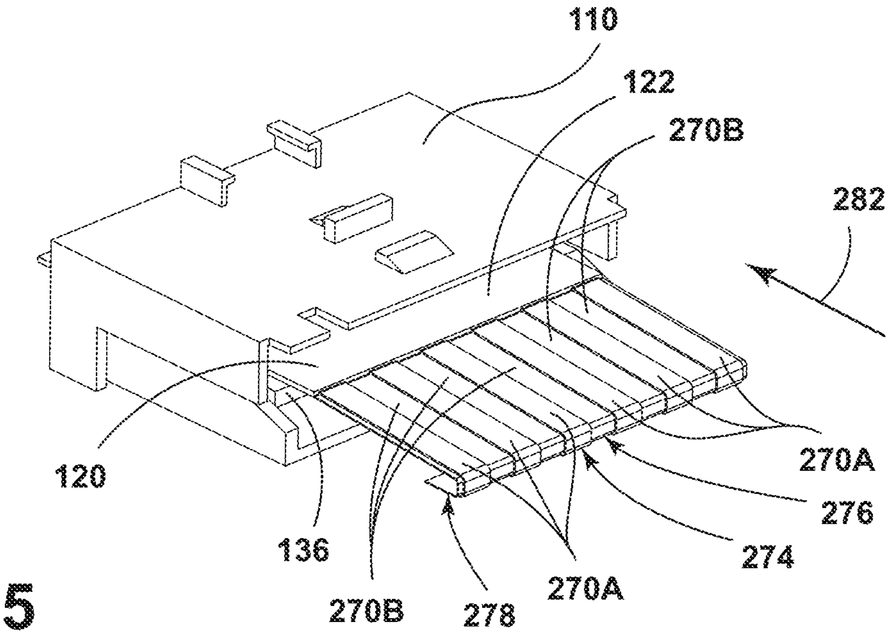
Figure 16:
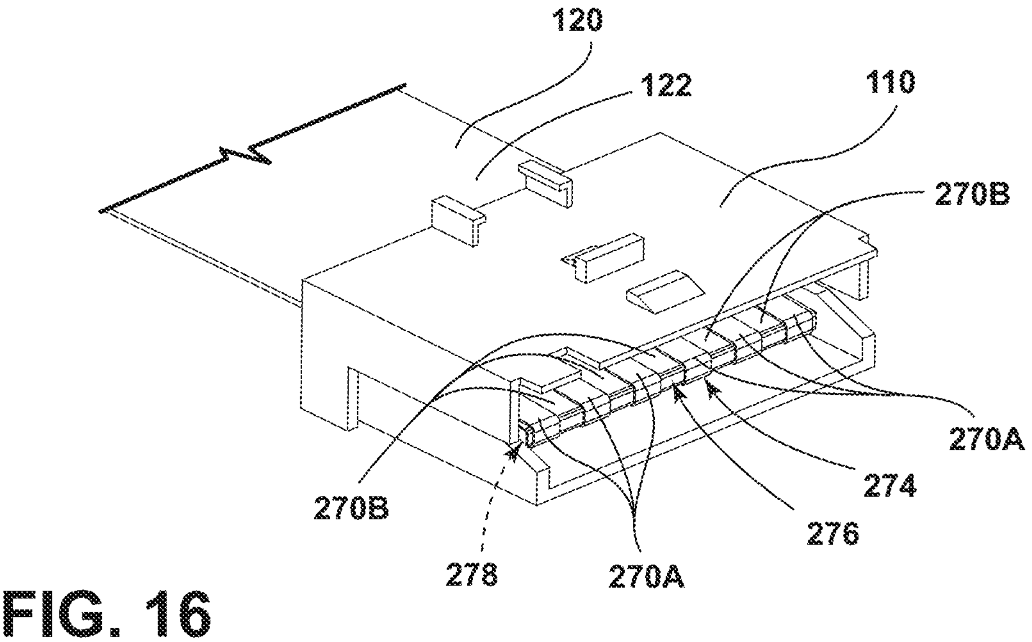
Figure 20:
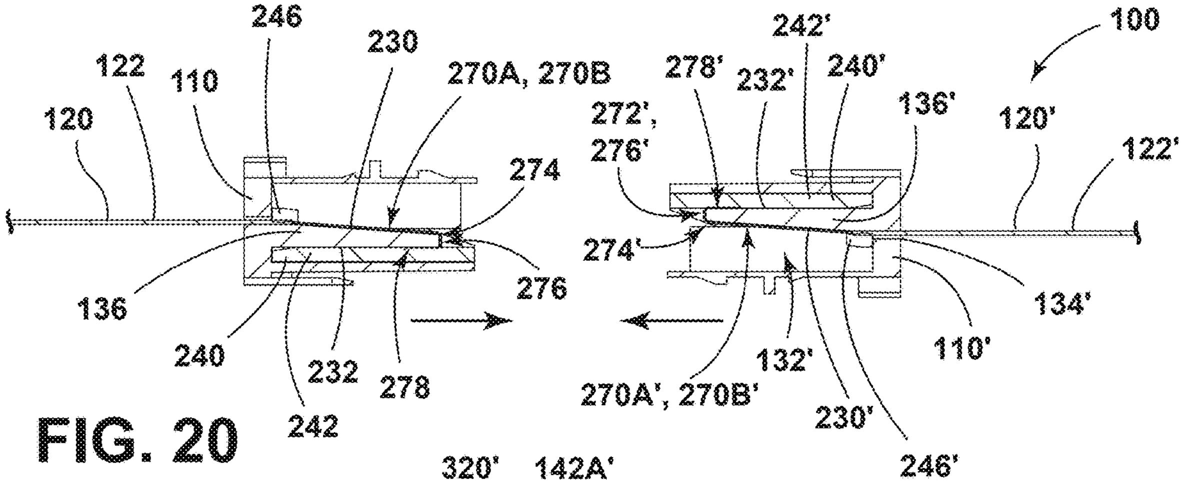
FIGS. 20 and 21 are cross-sectional views generally illustrating an embodiment of a method of assembling an electrical assembly according to teachings of the present disclosure.

With reference to FIGS. 15 and 16, a folded end 274 of a flat cable 120, 120' includes a first portion 276, 276' and a second portion 278, 278'. The first portion 276, 276' may extend substantially orthogonal from a body 122, 122' of a flat cable 120, 120' and the second portion 278, 278' may extend substantially parallel to the body 122. For example, an end 274, 274' of a flat cable 120, 120', when folded, may include a U-shaped configuration that may open toward the electrical connector 110, 110' (e.g., in direction 282, which may be parallel with an X-direction). The method includes disposing the folded end 274 of the flat cable 120 in contact with a contact plate 136 of the electrical connector 110 and/or disposing the folded end 274' of the second flat cable 120' in contact with a contact plate 136 of the second electrical connector 110'. In some instances, a flat cable 120, 120' may be moved in a second direction 282 that is opposite the first direction 280 such that a folded end 274, 274' of the flat cable 120, 120' is in contact with a contact plate 136 of an electrical connector 110, 110' (see, e.g., FIG. 15). The movement in the second direction 282 may include pulling a portion of the flat cable 120, 120' back through the slot 134, 134' such that the folded end 274, 274' is hooked on the contact plate 136, 136'. With reference to FIG. 20, in an assembled configuration, a flat cable 120, 120' may be in contact with a first surface 230 and/or a second surface 232 of a contact plate 136 of an electrical connector 110, 110'. In some example configurations, a portion of a body 122 of a flat cable 120, 120' may be in contact with the first surface 230 and a second portion 278 of a folded end 274 of a flat cable 120, 120' may be in contact with the second surface 232.

Figure 17:
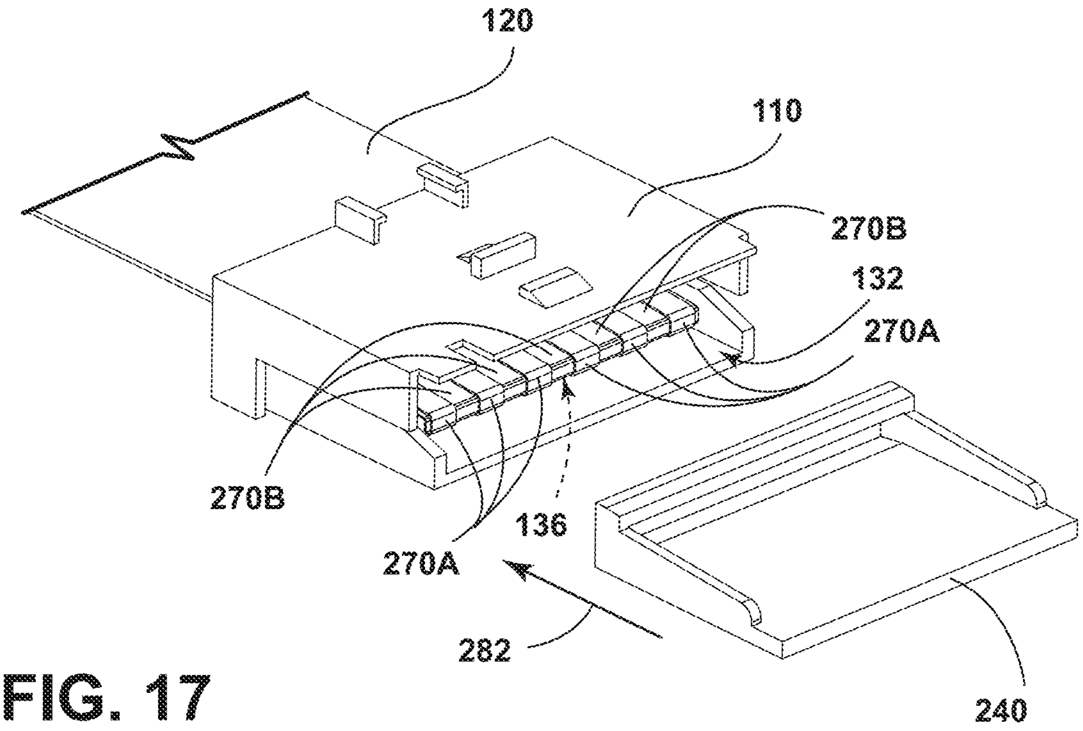
Figure 18:
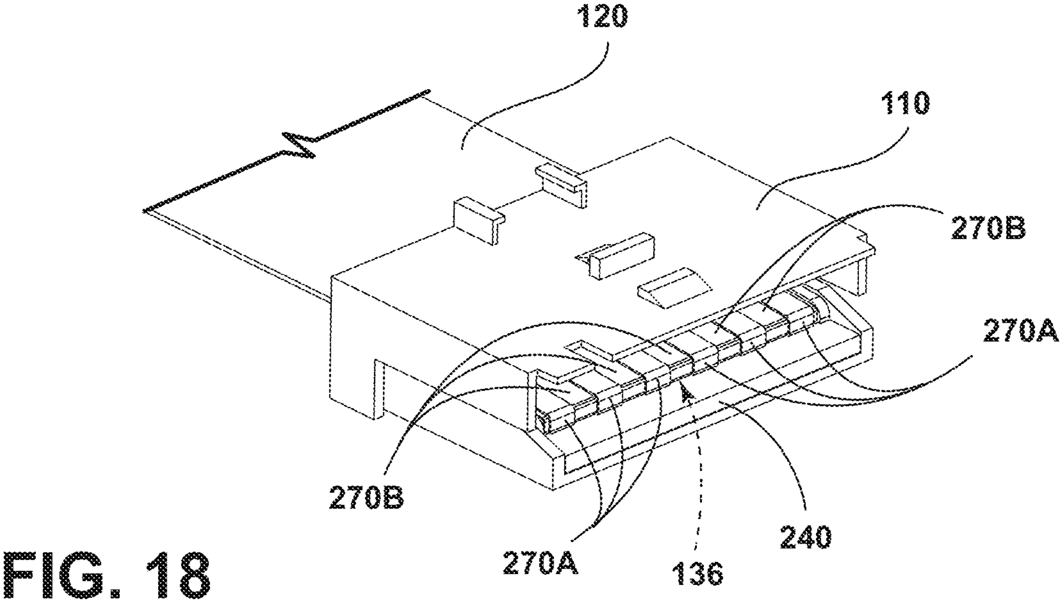

Referring now to FIGS. 17 and 18, the method includes securing the flat cable 120 to the contact plate 136 of the electrical connector 110 via a wedge 240 and securing the second flat cable 120' to the contact plate 136 of the second electrical connector 110' via a second wedge 240'. In some instances, a wedge 240, 240' may be inserted into a cavity 132 of an electrical connector 110, 110' and/or positioned within the cavity 132 such that a portion of a flat cable 120, 120' (e.g., a portion of a body 122) is disposed between a connecting portion 246 of a wedge 240, 240' and a first surface 230 of a contact plate 136 and a portion of a flat cable 120, 120' (e.g., a second portion 278 of a folded end 274) is disposed between a base 242, 242' of a wedge 240, 240' and surface 232, 232' of the contact plate 136 (see, e.g., FIG. 20).

Figure 19:
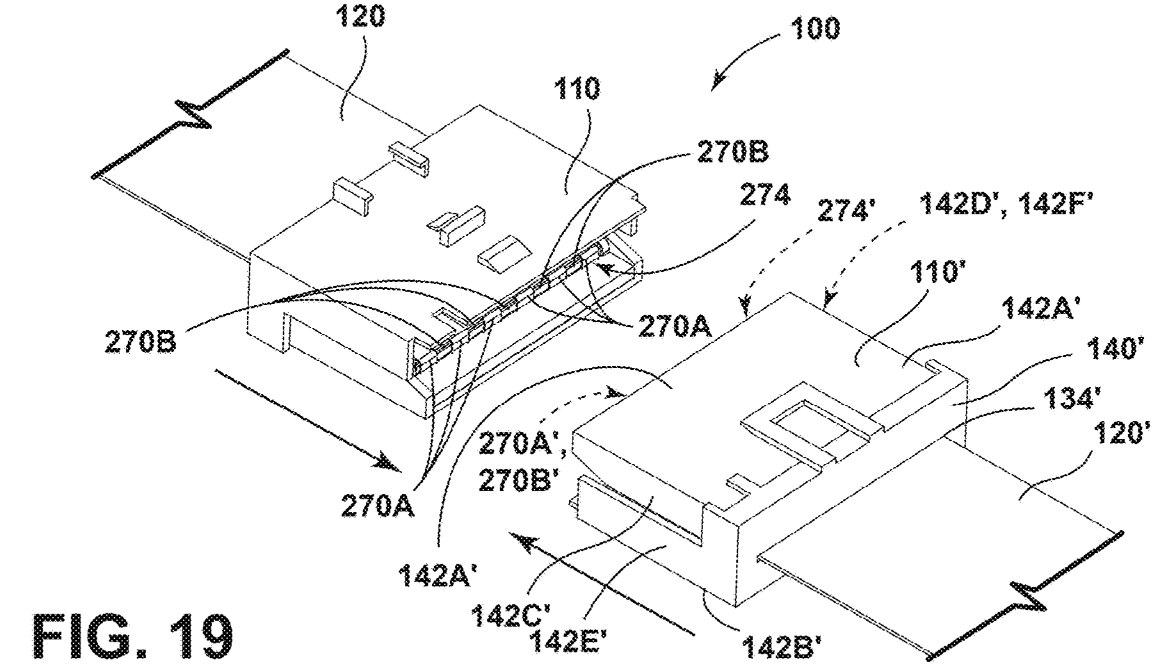
Figure 21:
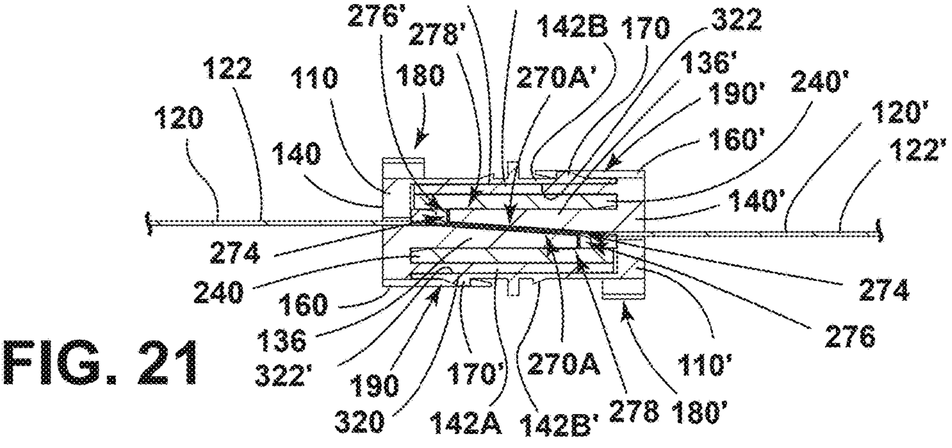

With reference to FIGS. 19-21, the method includes connecting the electrical connector 110 to a second electrical connector 110'. The second electrical connector 110' may be formed and/or assembled in the same or a similar manner as the electrical connector 110. For example, a second electrical connector 110' may include a housing 130', an internal cavity 132', a slot 134', a contact plate 136', an end wall 140', sidewalls 142A'-142F', a latch 160', a protrusion 170', a mount 180', a void 190', and/or a wedge 240'. The method may include inserting a second flat cable 120' into the slot 134' of the second electrical connector 110' and/or bending an end 274' of the second flat cable 120' to provide a first portion 276' and a second portion 278' that may have a U-shaped configuration. The electrical connector 110 is connected to the second electrical connector 110' such that at least one exposed conductor 270A of the flat cable 120 secured to the contact plate 136 of the electrical connector 110 is electrically connected with at least one exposed conductor 270A' of the second flat cable 120' secured to the contact plate 136' of the second electrical connector 110' (see, e.g., FIG. 21).

Referring to FIG. 21, in an assembled configuration, the contact plate 136 of the electrical connector 110 is disposed adjacent to the contact plate 136' of the second electrical connector 110' such that at least one exposed conductor 270A of the flat cable 120 is in direct contact with and/or electrically connected to at least one exposed conductor 270A' of the second flat cable 120'. In some examples, an outer surface 320 of the first sidewall 142A of the electrical connector 110 is in contact with an inner surface 322' of the second sidewall 142B' of the second electrical connector 110', and/or an outer surface 320' of the first sidewall 142A' of the second electrical connector 110' is in contact with an inner surface 322 of the second sidewall 142B' of the electrical connector 110.

In an assembled configuration, the protrusion 170 of the electrical connector 110 is at least partially disposed within the void 190' of the latch 160' of the second electrical connector 110', and/or the protrusion 170' of the second electrical connector 110' is at least partially disposed within the void 190 of the latch 160 of the electrical connector 110 (see, e.g., FIG. 21). In some examples, the outer surface 154 of the fifth sidewall 142E of the electrical connector 110 is aligned flush with the outer surface 154' of the fifth sidewall 142E' of the second electrical connector 110', and/or the outer surface 156 of the sixth sidewall 142F of the electrical connector 110 is aligned flush with the outer surface 156' of the sixth sidewall 142F' of the second electrical connector 110' (see, e.g., FIG. 1). Additionally or alternatively, the third sidewalls 142C, 142C' may be aligned with each other (e.g., in a Z-direction), and/or the fourth sidewalls 142D, 142D' may be aligned with each other (e.g., in the Z-direction). The third sidewalls 142C, 142C' may be disposed inside of and/or in contact with inner surfaces of the fifth sidewalls 142E', 142E, respectively. The fourth sidewalls 142D, 142D' may be disposed inside of and/or in contact with inner surfaces of the sixth sidewalls 142F', 142F, respectively.

Optionally, in an assembled configuration, the electrical connectors 110, 110' cooperate to form a generally rectangular prism. In certain examples, the housings 130, 130', when connected, may form six planar outer surfaces and/or only the latches 160, 160', the protrusions 170, 170', and the mounts 180, 180' may extend from the outer surfaces of the housings 130, 130'.

This disclosure includes, without limitation, the following embodiments:

1. An electrical connector for a flat cable, the electrical connector comprising: a housing, including: an internal cavity; a slot in communication with the internal cavity, the slot receiving said flat cable; and a contact plate disposed in the internal cavity; and a wedge that connects with the contact plate, the wedge formed separately from the housing; wherein the housing and the wedge secure a portion of said flat cable in the cavity.
2. The electrical connector according to embodiment 1, wherein the housing includes: an end wall; a first sidewall extending from the end wall; a second sidewall spaced from the first sidewall; a third sidewall extending from the first sidewall towards the second sidewall; a fourth sidewall spaced apart from the third sidewall; a fifth sidewall extending from the second sidewall towards the first sidewall, the fifth sidewall having a first portion and a second portion, and the first portion terminating before the first sidewall; and a sixth sidewall spaced apart from the fifth sidewall.
3. The electrical connector according to embodiment 1 or 2, wherein a first distance from an outer surface of the third sidewall to an outer surface of the fourth sidewall is less than a second distance from an outer surface of the fifth sidewall to an outer surface of the sixth sidewall; and the third sidewall, the fourth sidewall, the fifth sidewall, and the sixth sidewall are parallel.
4. The electrical connector according to any preceding embodiment, wherein the housing includes: a latch extending from an end wall of the housing and spaced apart from a first sidewall of the housing; and a protrusion extending from a second sidewall of the housing; and wherein in an assembled configuration: the latch engages a second protrusion of a second electrical connector, and the protrusion engages a second latch of said second electrical connector.
5. The electrical connector according to any preceding embodiment, wherein the housing includes a mount that connects with a fastener to connect the electrical connector with an external object.
6. The electrical connector according to any preceding embodiment, wherein: the contact plate extends from a first end of the housing towards a second end of the housing; the contact plate includes a first surface that slopes downward from the first end towards the second end, and a second surface that is spaced from the first surface; and in an assembled configuration, the first surface and the second surface contact said flat cable.
7. The electrical connector according to any preceding embodiment, wherein the wedge includes: a base having a first end and a second end; a first sidewall and a second sidewall extending from the first end towards the second end; and a connecting portion connected to the first sidewall and the second sidewall and spaced apart from the base; wherein in the assembled configuration, the wedge is connected with the contact plate such that a first part of said flat cable is disposed between the base and the second surface of the contact plate and a second part of said flat cable is disposed between the connecting portion and the first surface of the contact plate.
8. The electrical connector according to any preceding embodiment, wherein the housing is reversible such that it can be mated with a second housing of a second connector to connect said flat cable with a second flat cable.
9. The electrical connector according to any preceding embodiment, wherein the internal cavity includes a first cavity portion disposed between a first lateral side surface of the contact plate and a first interior surface of the housing; and the internal cavity includes a second cavity portion disposed between a second lateral side surface of the contact plate and a second interior surface of the housing.
10. The electrical connector according to any preceding embodiment, wherein in an assembled configuration, a portion of a first sidewall of the wedge is disposed in the first cavity portion and a portion of a second sidewall of the wedge is disposed within the second cavity portion.
11. An electrical assembly, comprising: the electrical connector according to any preceding embodiment; a second electrical connector identical to the electrical connector; the flat cable; and a second flat cable; wherein the second electrical connector connects with the second flat cable and the electrical connector; and in an assembled configuration, the second electrical connector is connected to the electrical connector such that the flat cable is electrically connected to the second flat cable.
12. The electrical assembly according to embodiment 11, wherein the flat cable and the second flat cable each include at least one exposed electrical conductor; and in the assembled configuration, (i) the at least one conductor of the flat cable is in contact with the contact plate of the electrical connector, (ii) the at least one conductor of the second flat cable is in contact with the contact plate of the second electrical connector, and (iii) the contact plate of the electrical connector is disposed adjacent to the contact plate of the second electrical connector such that the at least one conductor of the flat cable is electrically connected to the at least one conductor of the second flat cable.
13. The electrical assembly according to embodiments 11 or 12, wherein the electrical connector and the second electrical connector each include a first sidewall and a second sidewall spaced apart from the first sidewall; and in the assembled configuration, (i) an outer surface of the first sidewall of the electrical connector is in contact with an inner surface of the second sidewall of the second electrical connector, and (ii) an outer surface of the first sidewall of the second electrical connector is in contact with an inner surface of the second sidewall of the electrical connector.

14. The electrical assembly according to any of embodiments 11-13, wherein the electrical connector and the second electrical connector each include a protrusion and a latch having a void; and in the assembled configuration, (i) the protrusion of the electrical connector is at least partially disposed within the void of the latch of the second electrical connector, and (ii) the protrusion of the second electrical connector is at least partially disposed within the void of the latch of the electrical connector.

15. The electrical assembly according to any of embodiments 11-14, wherein the electrical connector and the second electrical connector each include a sidewall and an additional sidewall spaced apart from the sidewall; and in the assembled configuration, (i) an outer surface of the sidewall of the electrical connector is flush with an outer surface of the sidewall of the second electrical connector, and (ii) an outer surface of the additional sidewall of the electrical connector is aligned flush with an outer surface of the additional sidewall of the second electrical connector.

16. A method of assembling the electrical assembly according to embodiment 11, the method comprising: inserting the flat cable into the slot of the electrical connector; folding, via a folding tool, an end of the flat cable; disposing the folded end of the flat cable in contact with the contact plate of the electrical connector; and securing the flat cable to the contact plate via the wedge.

17. The method according to embodiment 16, including: inserting the second flat cable into a slot of the second electrical connector; folding, via the folding tool, an end of the second flat cable; disposing the folded end of the second flat cable in contact with a contact plate of the second electrical connector; and securing the second flat cable to the contact plate via a wedge of the second electrical connector.

18. The method according to embodiment 16 or 17, including, prior to folding the end of the flat cable, moving the flat cable in a first direction through the electrical connector such that the end of the flat cable is disposed outside of the electrical connector.

19. The method according to any of embodiments 16-18, wherein disposing the folded end of the flat cable in contact with the contact plate of the electrical connector includes moving the flat cable in a second direction that is opposite the first direction such that the flat cable is in contact with a first surface and a second surface of the contact plate.

20. The method according to any of embodiments 16-19, including connecting the electrical connector to the second electrical connector such that at least one exposed electrical conductor of the flat cable in contact with the contact plate of the electrical connector is electrically connected with at least one exposed electrical conductor of the second flat cable in contact with the contact plate of the second electrical connector.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

All matter contained in the above description or shown in the accompanying drawings shall be interpreted as illustrative only and not limiting. Changes in detail or structure may be made without departing from the present disclosure.

What is claimed is:

1. An electrical connector for a flat cable, the electrical connector comprising:
- a housing, including:
- an internal cavity;
- a slot in communication with the internal cavity, the slot receiving said flat cable; and
- a contact plate disposed in the internal cavity; and
- a wedge that connects with the contact plate, the wedge formed separately from the housing;
- wherein the housing and the wedge secure a portion of said flat cable in the cavity; and
- wherein the housing includes:
  - an end wall;
  - a first sidewall extending from the end wall;
  - a second sidewall spaced from the first sidewall;
  - a third sidewall extending from the first sidewall towards the second sidewall;
  - a fourth sidewall spaced apart from the third sidewall;
  - a fifth sidewall extending from the second sidewall towards the first sidewall, the fifth sidewall having a first portion and a second portion, and the first portion terminating before the first sidewall; and
  - a sixth sidewall spaced apart from the fifth sidewall.

2. The electrical connector of claim 1, wherein the housing includes:
- a latch extending from an end wall of the housing and spaced apart from a first sidewall of the housing; and
- a protrusion extending from a second sidewall of the housing; and
- wherein in an assembled configuration:
- the latch engages a second protrusion of a second electrical connector, and
- the protrusion engages a second latch of said second electrical connector.

3. The electrical connector of claim 1, wherein the housing includes a mount that connects with a fastener to connect the electrical connector with an external object.

4. The electrical connector of claim 1, wherein the housing is reversible such that it can be mated with a second housing of a second connector to connect said flat cable with a second flat cable.

5. The electrical connector of claim 1, wherein the internal cavity includes a first cavity portion disposed between a first lateral side surface of the contact plate and a first interior surface of the housing; and
- the internal cavity includes a second cavity portion disposed between a second lateral side surface of the contact plate and a second interior surface of the housing.

6. The electrical connector of claim 5, wherein in an assembled configuration, a portion of a first sidewall of the wedge is disposed in the first cavity portion and a portion of a second sidewall of the wedge is disposed within the second cavity portion.

7. An electrical assembly, comprising:
- the electrical connector of claim 1;
- a second electrical connector identical to the electrical connector;
- the flat cable; and
- a second flat cable;
- wherein the second electrical connector connects with the second flat cable and the electrical connector; and
- in an assembled configuration, the second electrical connector is connected to the electrical connector such that the flat cable is electrically connected to the second flat cable.

8. The electrical assembly of claim 7, wherein the flat cable and the second flat cable each include at least one exposed electrical conductor; and
- in the assembled configuration, (i) the at least one conductor of the flat cable is in contact with the contact plate of the electrical connector, (ii) the at least one conductor of the second flat cable is in contact with the contact plate of the second electrical connector, and (iii) the contact plate of the electrical connector is disposed adjacent to the contact plate of the second electrical connector such that the at least one conductor of the flat cable is electrically connected to the at least one conductor of the second flat cable.

9. The electrical assembly of claim 7, wherein the electrical connector and the second electrical connector each include a first sidewall and a second sidewall spaced apart from the first sidewall; and
- in the assembled configuration, (i) an outer surface of the first sidewall of the electrical connector is in contact with an inner surface of the second sidewall of the second electrical connector, and (ii) an outer surface of the first sidewall of the second electrical connector is in contact with an inner surface of the second sidewall of the electrical connector.

10. The electrical assembly of claim 7, wherein the electrical connector and the second electrical connector each include a protrusion and a latch having a void; and
- in the assembled configuration, (i) the protrusion of the electrical connector is at least partially disposed within the void of the latch of the second electrical connector, and (ii) the protrusion of the second electrical connector is at least partially disposed within the void of the latch of the electrical connector.

11. The electrical assembly of claim 7, wherein the electrical connector and the second electrical connector each include a sidewall and an additional sidewall spaced apart from the sidewall; and in the assembled configuration, (i) an outer surface of the sidewall of the electrical connector is flush with an outer surface of the sidewall of the second electrical connector, and (ii) an outer surface of the additional sidewall of the electrical connector is aligned flush with an outer surface of the additional sidewall of the second electrical connector.

12. A method of assembling the electrical assembly of claim 7, the method comprising:

inserting the flat cable into the slot of the electrical connector;

folding, via a folding tool, an end of the flat cable;

disposing the folded end of the flat cable in contact with the contact plate of the electrical connector; and securing the flat cable to the contact plate via the wedge.

13. The method of claim 12, including:

inserting the second flat cable into a slot of the second electrical connector;

folding, via the folding tool, an end of the second flat cable;

disposing the folded end of the second flat cable in contact with a contact plate of the second electrical connector; and securing the second flat cable to the contact plate via a wedge of the second electrical connector.

14. The method of claim 13, including connecting the electrical connector to the second electrical connector such that at least one exposed electrical conductor of the flat cable in contact with the contact plate of the electrical connector is electrically connected with at least one exposed electrical conductor of the second flat cable in contact with the contact plate of the second electrical connector.

15. The method of claim 12, including, prior to folding the end of the flat cable, moving the flat cable in a first direction through the electrical connector such that the end of the flat cable is disposed outside of the electrical connector.

16. The method of claim 15, wherein disposing the folded end of the flat cable in contact with the contact plate of the electrical connector includes moving the flat cable in a second direction that is opposite the first direction such that the flat cable is in contact with a first surface and a second surface of the contact plate.

17. An electrical connector for a flat cable, the electrical connector comprising:

a housing, including:

an internal cavity;

a slot in communication with the internal cavity, the slot receiving said flat cable; and a contact plate disposed in the internal cavity; and a wedge that connects with the contact plate, the wedge formed separately from the housing;

wherein the housing and the wedge secure a portion of said flat cable in the cavity; and wherein:

the contact plate extends from a first end of the housing towards a second end of the housing;

the contact plate includes a first surface that slopes downward from the first end towards the second end, and a second surface that is spaced from the first surface; and in an assembled configuration, the first surface and the second surface contact said flat cable.

18. The electrical connector of claim 17, wherein the housing includes:

an end wall;

a first sidewall extending from the end wall;

a second sidewall spaced from the first sidewall;

a third sidewall extending from the first sidewall towards the second sidewall;

a fourth sidewall spaced apart from the third sidewall;

a fifth sidewall extending from the second sidewall towards the first sidewall, the fifth sidewall having a first portion and a second portion, and the first portion terminating before the first sidewall; and a sixth sidewall spaced apart from the fifth sidewall.

19. The electrical connector of claim 18, wherein a first distance from an outer surface of the third sidewall to an outer surface of the fourth sidewall is less than a second distance from an outer surface of the fifth sidewall to an outer surface of the sixth sidewall; and the third sidewall, the fourth sidewall, the fifth sidewall, and the sixth sidewall are parallel.

20. The electrical connector of claim 17, wherein the wedge includes:

a base having a first end and a second end;

a first sidewall and a second sidewall extending from the first end towards the second end; and a connecting portion connected to the first sidewall and the second sidewall and spaced apart from the base;

wherein in the assembled configuration, the wedge is connected with the contact plate such that a first part of said flat cable is disposed between the base and the second surface of the contact plate and a second part of said flat cable is disposed between the connecting portion and the first surface of the contact plate.

* * * * *